May 8, 1956 J. W. E. HALLER 2,744,306

NOVEL MACHINE FOR TREATING NETTING

Filed April 18, 1952 2 Sheets-Sheet 1

INVENTOR.
JOHN WALTER ECROYD HALLER
BY Louis F. Reed
ATTORNEY

NOVEL MACHINE FOR TREATING NETTING

Filed April 18, 1952 2 Sheets-Sheet 2

*INVENTOR.*
JOHN WALTER ECROYD HALLER
*BY*
Louis J. Reed
ATTORNEY

United States Patent Office 2,744,306

Patented May 8, 1956

1

2,744,306

NOVEL MACHINE FOR TREATING NETTING

John Walter Ecroyd Haller, Belfast, Northern Ireland, assignor to The Linen Thread Company Limited, Glasgow, Scotland, a British company Application April 18, 1952, Serial No. 282,970

5 Claims. (Cl. 26—1)

This invention relates to a novel machine for treating netting, especially fish netting.

It is an object of the present invention to provide a novel machine for treating a net, and especially a fish net made with knotted meshes from thermo-sensitive synthetic resin twine, to make the treated net resistant to slippage at the knots.

It is an object of the present invention to provide a novel machine for treating a net, and especially a fish net made with knotted meshes from thermo-sensitive synthetic resin twine, to set the knots in the net.

It is further the object of the present invention to provide a machine, for use in treating a net, and especially a fishing net, formed with knotted meshes from thermo-sensitive synthetic resin twine, which comprises hot-fluid bath means through which the net may be passed to effect knot-setting, mechanical means adapted to effect passage of the net through said bath means, tensioning means adapted to tension the net during its passage through said bath means, and guide means adapted to maintain the net in a laterally condensed ribbon-like or rope-like form during passage of the net through said bath means.

Preferably, said machine incorporates means for cooling the net in ribbon-like or rope-like formation under tension, means for removing any tangles in the net prior to its reaching said guide means, and means adapted to fold the net in superimposed layers after treatment in the machine.

An example of the invention will now be described with reference to the accompanying drawing, in which.

Figure 1:
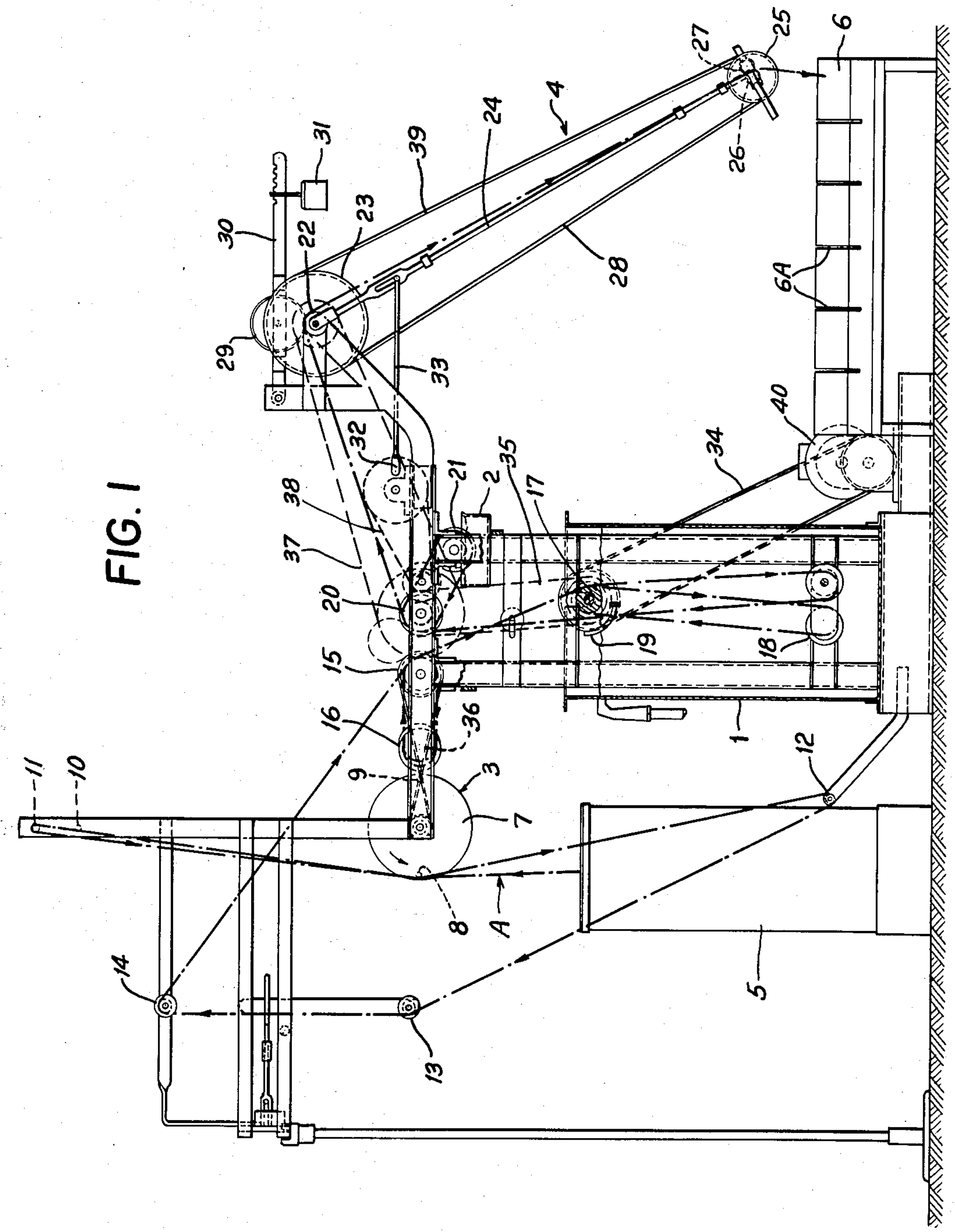
Fig. 1 is a diagrammatic side view of the machine.

The setting machine consists generally of an open-topped hot-water tank 1, an open topped cold water tank 2, a net beater 3, a net laying device 4, and a series of rollers and drives for effecting passage of the net from a container 5 through the machine to a receptacle 6.

The twine which is formed from a thermo-sensitive synthetic resin, nylon, Terylene or Dacron being highly satisfactory, is treated initially with a temporary binding agent or an agent adapted to increase the friction co-efficient of the twine, hereinafter referred to simply as a binding agent. The net is then formed with knotted meshes, and any tendency of the knots to loosen is minimised by the said binding agent. In this manner, the net can be left untensioned until such time as it is convenient to pass it through the setting machine. Thus, there is no necessity for the net to be passed immediately from the netting machine in a tensioned state to the setting machine, so that the nets, when formed, can be left stacked, until a suitable number have accumulated and can then be passed in succession through the setting machine. It will therefore be clear that one machine or a comparatively small number of machines are sufficient to deal with the total output of a netting factory, this resulting in a considerable saving in space, expense, and the number of operators required.

2

The nature of the temporary binding agent used is unimportant, as long as it minimises any tendency for the knots to loosen before they have been heat-set, and does not cause any undue difficulty in the weaving of the net. Suitable examples of temporary binding agents are as follows:

(1) A solution made up of:
10 gallons water,
2 lbs. textile (bar) soap,
10 lbs. Syton, (this being a dispersion of colloidal silica in an aqueous medium), or (2) A rosin dip made up of:
1½ lbs. rosin soap,
3 ozs. powdered rosin, and
3 gallons water In the setting operation, the net is drawn from the container 5 and passed through the machine, but before any net is passed to the machine a heavy nylon braided cord is fed through the machine to act as a guide. A heavy string is passed laterally through the first row of meshes in the net, looped, and then tied to the trailing end of the said cord. This ensures that the net passes through the machine with the various rows of knots aligned as closely as possible, so that the net is evenly tensioned throughout. A similar cord is attached to the end of the net for attachment to the string in the next net, and so on.

As aforesaid, the net, in loose form, is drawn from the container 5, and passes in contact with the beater 3, which consists of two interspaced rotary discs 7 interconnected by two diametrally opposed rods 8 and 9, which beat against the net to loosen any tangles therein. From there, the net passes upwards between two fixed rods 10, 11 and around the latter and down and around a rod 12, the bars 10, 11, 12 effecting a certain amount of tension which causes the net to maintain a ribbon-like formation which it maintains throughout its passage in the machine. In this embodiment of the invention the net is brought into contact with the beater twice; once when passing from rod 10 to rod 11, and again when passing from rod 11 to rod 12.

The net then passes in succession around a series of rollers and pulleys 13 to 18 and 20, 21, and its path is clearly indicated by the chain-dotted line A, the arrowheads thereon indicating its various directions of movement.

Figure 2:
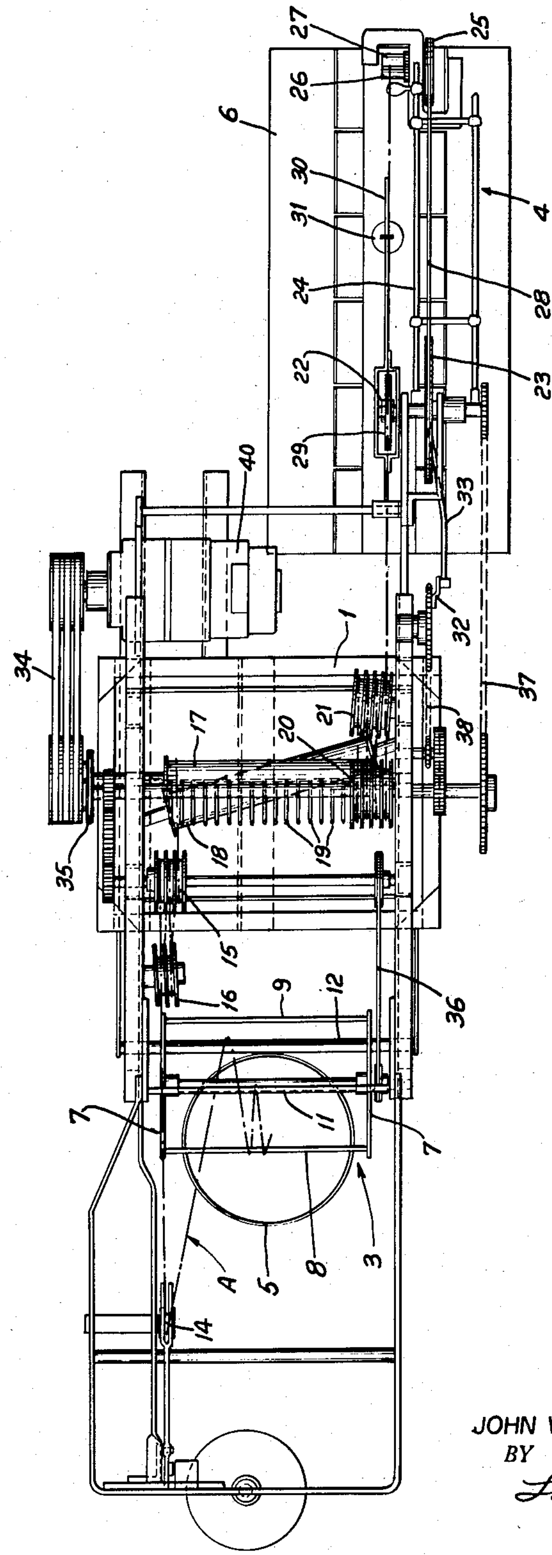
Fig. 2 is a diagrammatic plan view corresponding to Fig. 1.

The pulleys 15 and 16 are respectively in the form of treble and double pulley or guide wheels, the sections of at least one of these being of successively increasing diameters, and the ribbon passes successively around same and is increasingly tensioned before passing down to and in a plurality of successive loops around rollers 17 and 18, the path of the loops being defined by guide fingers 19. To facilitate the unwinding of the ribbon from the pulley 15 to pulley 16, the latter is slightly angled as shown in Fig. 2. The rollers 17 and 18 are located within the tank 1 and at least one increases in diameter from its intake end to its output end so that the ribbon is further tensioned during the actual knot setting which is effected by the ribbon passing through boiling water in the tank 1. It will be seen from Fig. 2 that the roller 17 lies at an angle to roller 18 so as to effect movement of the ribbon from one end to the other. The arrangement of pulleys 20, 21 is similar to rollers 15, 16, and the roller 21 is located so that it passes the ribbon through cold water in the tank 2.

From the roller 20, the ribbon passes into the net laying device 4. The device 4 consists of concentric pulley wheels 22 and 23, and on the same axis as the wheels 22, 23, a freely oscillatory arm 24. At its lower end, the arm 24 carries a pulley wheel 25 and two small rollers 26, 27 geared so as to be driven by the pulley wheel 25. The pulley wheels 23 and 25 are interconnected by a belt drive 28, and the ribbon passes around the pulley wheel 22 down between the rollers 26, 27 and from there is fed into the receptacle 6. A disc rubber-covered roller 29 presses on top of the ribbon as it passes over the pulley wheel 22 and is mounted on a pivotal bar 30 which is loaded by a weight 31, in order to ensure that tension is maintained up to this point. The oscillatory motion of the arm 24 is effected by a crank drive 32 and a connecting rod 33, so that the lower end of the arm 24 swings from end to end of the receptacle 6 and as the ribbon is fed from between the rollers 26, 27, it is laid in superimposed layers in the receptacle.

A number of driving connections are provided to drive the various rollers 15 to 18, and 20, 21 at appropriate speeds to assist in obtaining the desired degree of tensioning, and to drive the beater 3, and the net laying device 4, said driving connections being indicated by chain lines at 34 to 39, and the main drive being at 34 from an electric motor 40. Stop means indicated at B is provided to stop the machine should any tangled portion of the net pass the beater 3 without being untangled, and a thermostat may be provided on the tank 1 to ensure that the water therein is kept at the required temperature which is preferably boiling point to ensure optimum results. Also the tank 2 is preferably maintained with a constant fresh supply of cold water. The receptacle 6 is provided on each side wall with opposed slots 6A, and strings are wound from one slot to the other across the receptacle so as to divide the folded net into easily carried portions and to minimise the possibility of entanglement.

In one method, the net is formed with a mesh larger than that finally required by an amount equal to the amount of shrinkage calculated to take place during its passage through the machine. From experiment it has been found that the said amount is approximately 5%, but it is to be understood that this may vary depending on the tensions applied in forming the net and during passage through the machine, and on the composition, previous treatment or twist of the twine itself. Prior to commencing heat-setting treatment, it is therefore recommended that a sample of the netting be first passed through the machine so that the shrinkage may be first calculated for the particular supply of twine used.

The invention is not restricted to the last-mentioned method, and in other methods the net may be formed with a size of mesh calculated otherwise to give the size finally required, after treatment. Also, in certain cases, the net may be dried whilst still under tension.

So far, nylon and Terylene nets made from widely varying thickness of twine, with either single or double knotting, have been successfully treated in accordance with the invention.

Boiling water has been chosen as the preferred heat-setting medium, and the use of water, as opposed to steam or dry heat, is advantageous in that it permits the use of a comparatively simple machine, and avoids the discoloration of the twine which frequently occurs when employing these other heating media, and which latter have, from my experience, been found to require higher temperatures in order to attain a similar degree of knot-setting.

In laboratory experiments it has been found that a time of immersion of approximately 30 seconds for 420 denier nylon twine is satisfactory, but the machine is designed to give a longer period of immersion to ensure that the period would be adequate even when treating nets made from much heavier twines. In the foregoing example, the time for the passage through the tank 1 of any given portion of the net is 75 seconds.

The degree of tension is not critical. It should, however, be sufficient to ensure that all knots are drawn quite tight, but should be insufficient to cause damage to the net through excessive strain on the knots.

Also, as aforesaid, the water in the tank 1 is preferably maintained at boiling point and the water in the tank 2 maintained running cold. The given time of immersion of the ribbon in the tanks 1 and 2 and the given temperatures of the water therein are not considered critical but have been found to provide satisfactory results in producing an efficient set. Lowering of these factors may effect a lowering in the efficiency of the set. Whilst the said factors are not considered critical, it is to be understood that they are kept constant throughout the operation, so that the net is evenly treated throughout.

The condensing of the net into ribbon-like or rope-like form is important in that it permits the net to be evenly tensioned throughout its length in a simple and highly satisfactory manner, and in that it permits the use of a setting-machine of comparatively very small dimensions and simplicity in design and operation.

With reference to the treatment with a binding agent aforementioned, it is to be understood that this is not essential to the invention, but is preferably employed, and it is either washed out in the tanks of the machine or scoured out at a later stage if necessary. Also the removal of the binding agent is not essential, but again is preferable, so that the nylon, for example, in the finished net may retain its natural and attractive lustre. When a binding agent is not used, the net may or may not be held tensioned until required for the heat-setting process, this depending on the circumstances including the type of knot used.

The invention is especially applicable to fishing nets, but it will be understood that the nets may be produced or used for other purposes. Fishing nets, when produced in accordance with the invention have been found highly satisfactory.

In the term thermo-sensitive synthetic resin twine are included twines made from the fibres known commercially as nylon, Perlon, Terylene, Dacron, Orlon, Amilan, and fibres of similar composition and nature but which may be marketed under different commercial names. This term is also intended to include twines made from other thermo-sensitive synthetic resin fibres possessing properties suitable for the purpose for which the net is to be used and which are also thermo-plastic to a degree suited to the method according to the present invention. The said fibres comprising the twines may be either in the form of a multiplicity of continuous filaments or in the form known as staple fibre. The term nylon is generic and covers the entire group of materials known as synthetic polyamide fibres, and it is to be understood that the invention is equally applicable to twines made from any fibre of this group which possesses the properties above-mentioned.

By the term twine is meant twine, yarn or thread.

Setting of the knots by the method according to the present invention, eliminates or greatly minimises any tendency for the knots to loosen in the finished net. It is also found that any tendency for the mesh size to alter during use of the net is eliminated or greatly minimised.

What I claim is:

1. A machine for use in continuously setting the knots of lengths of netting of varying widths, and especially fishnets formed of thermo-sensitive synthetic resin twines, said machine comprising a hot, aqueous bath means maintained at a temperature sufficient to heat-set the knots of the netting when the netting is passed through said bath means, driving means to effect the passage of netting continuously through said machine, tensioning means adapted to continuously tension the net lengthwise during its passage through said hot, aqueous bath means, and a guide means adapted to maintain the net in a laterally condensed ribbon-like or rope-like form during passage of the netting through said bath means.

2. A machine for use in continuously setting the knots of lengths of netting of varying widths, and especially fishnets formed of thermo-sensitive synthetic resin twines, said machine comprising a hot water tank in which the water is maintained at a temperature sufficient to heat-set the knots of the netting when the netting is passed through the hot water, a driving means to effect the passage of netting continuously through said machine, tensioning means comprising interspaced rollers located within said hot water tank around which the netting passes in successive loops, at least one of said rollers increasing gradually in diameter from one end to the other to effect continuous and progressively increasing tension lengthwise upon the netting during its passage through said hot water tank, said rollers being so positioned as not to substantially increase the tension upon the netting until the hot water in said tank has partially softened the thermo-sensitive synthetic resin twines comprising the netting, and a guide means adapted to maintain the net in a laterally condensed ribbon-like or rope-like form during passage of the netting through said hot water tank.

3. A machine according to claim 2, in which means is provided to effect cooling of the net under tension after the net has passed from the said hot water tank.

4. A machine according to claim 3, in which a beating device is provided to remove any tangles from the net prior to the net being tensioned.

5. A machine according to claim 4, wherein the beating device comprises a plurality of rigid interconnecting members separating two interspaced rotary discs, said beating device being positioned to remove tangles in the unset netting prior to tensioning and passing the netting into the hot water tank.

References Cited in the file of this patent

UNITED STATES PATENTS

| | | |
|---|---|---|
| 78,716 | Arnold | June 6, 1868 |
| 266,248 | Worrall | Oct. 17, 1882 |
| 278,125 | Gibson | May 22, 1883 |
| 338,096 | Meikle | Mar. 16, 1886 |
| 345,002 | Spalding | July 6, 1886 |
| 1,096,845 | Landsberger | May 19, 1914 |
| 1,213,527 | Marley | Jan. 13, 1917 |
| 1,232,653 | Buhl | July 10, 1917 |
| 1,340,809 | Wilcox | May 18, 1920 |
| 1,932,105 | Hinnekens | Oct. 24, 1933 |
| 2,162,115 | Pauls | June 13, 1939 |
| 2,346,696 | Moritz | Apr. 8, 1944 |
| 2,360,352 | Lodge | Oct. 17, 1944 |
| 2,385,403 | Conaway | Sept. 25, 1945 |
| 2,499,477 | Field | Mar. 7, 1950 |
| 2,513,057 | Schrenk | June 27, 1950 |